April 25, 1944.   L. A. PARADISE   2,347,365
HARVESTING MECHANISM
Filed Oct. 18, 1941
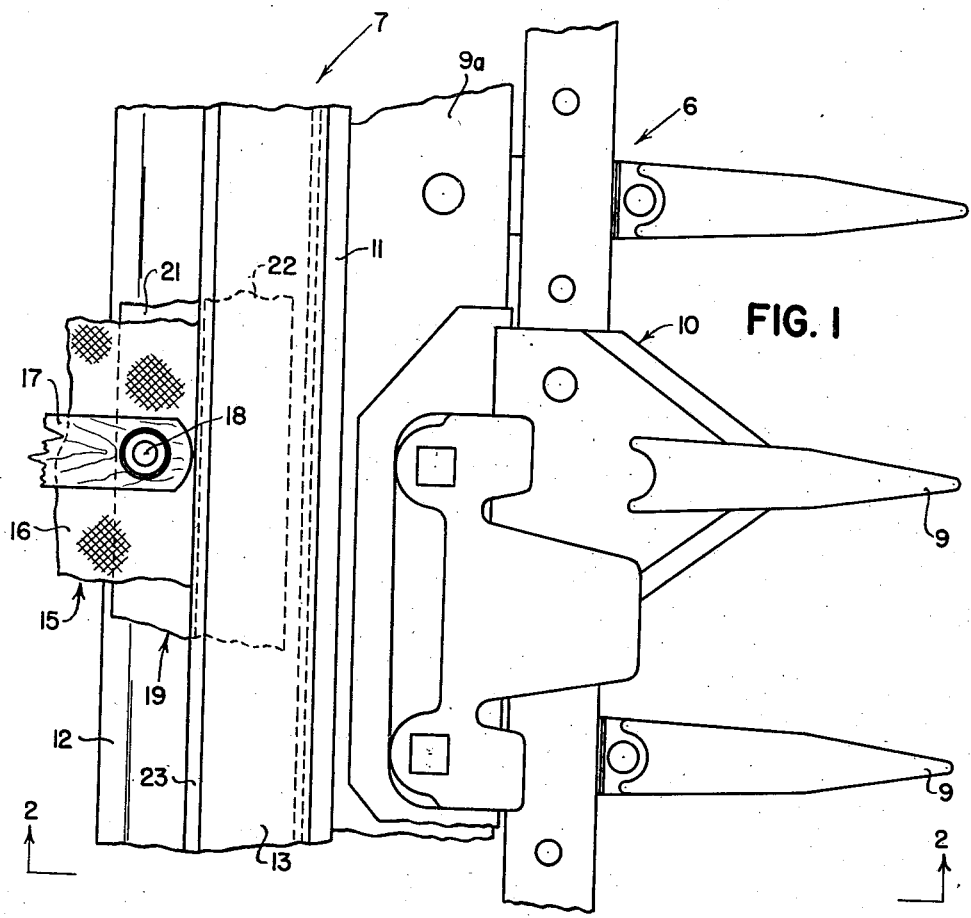
FIG. 1
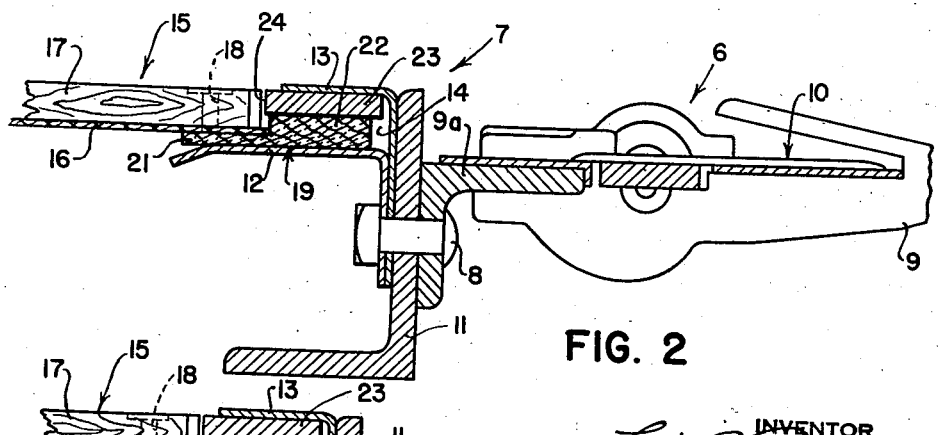
FIG. 2
FIG. 3
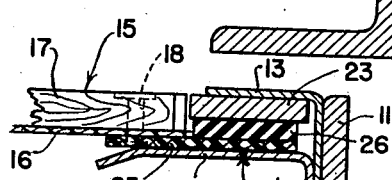
INVENTOR
Louis A. Paradise
BY
ATTORNEYS Patented Apr. 25, 1944

2,347,365

UNITED STATES PATENT OFFICE 2,347,365

HARVESTING MECHANISM

Louis A. Paradise, Moline, Ill., assignor to Deere & Company, Moline, Ill., a corporation of Illinois Application October 18, 1941, Serial No. 415,563

3 Claims. (Cl. 198—184)

The present invention relates to grain harvesting machines and more particularly to harvesters of the type having one or more drapers for conveying harvested crops along the platform.

In the past, implement owners have experienced some difficulty with drapers or conveyors due to material falling from the edge of the canvas and collecting between the upper and lower runs, resulting in wear on the conveyor; and in some instances sufficient material collects between the runs of the conveyor to cause a stoppage, making it necessary to remove the canvas and clean out the collected material. The principal object of the present invention is to eliminate this difficulty by providing a novel sealing means along the edge of the conveyor.

Other objects and advantages of the present invention will become apparent to those skilled in the art after consideration of the following detailed description of the preferred embodiment thereof, reference being had to the accompanying drawing, in which Figure 1 is a plan view of a portion of a harvester platform embodying the present invention;

Figure 2 is a sectional elevation taken along line 2—2 in Figure 1 and drawn to an enlarged scale; and Figure 3 is a fragmentary section similar to Figure 2, but illustrates a modification thereof.

Referring now to the drawing, reference numeral 6 indicates a cutter bar mounted on a harvester platform, indicated generally by reference numeral 7. The cutter bar 6 is of the conventional type, comprising a plurality of forwardly extending guards 9 bolted to a supporting angle bar 9a. A conventional sickle is indicated by reference numeral 10. The platform 7 has an angle iron frame member 11 forming its leading edge to which the angle member 9a is fastened by suitably spaced bolts 8. Fixed to the back of the frame member 11 by the bolts 8 are a pair of L-shaped members 12 and 13, extending longitudinally of the platform and having rearwardly extending, generally horizontal flanges forming a channel 14, in which the edge of the upper run of the conveyor 15 travels.

The conveyor 15 is of the usual type, comprising a canvas belt 16 to which are attached a plurality of transverse slats 17 by rivets 18. Rivets 18 are of such length that they pass through the slats 17, the belt 16, and through a reenforcing and sealing strip 19. The strip 19 in this embodiment is made of fabric and is reenforced along the outer edge with additional plies to define a thin portion 21 and a thicker portion 22. The thin portion 21 extends beneath the edge of the conveyor belt 16 providing the fastening means through which the rivets 18 pass; and the thicker portion 22 extends beyond the conveyor slats into the channel 14, where it lies upon and is adapted to slide along the lower flange member 12. A sealing bar 23 is fixed to the upper flange member 13 beneath the latter and is positioned in sliding contact with the top surface of the thicker portion 22 of the strip 19.

The ends of the slats 17 abut the inner edge 24 of the bar 23, which serves as a guide therefor. Thus it is evident, that in order for any grain or straw to collect between the runs of the canvas, it must travel outwardly between the strip 19 and the bar 23 and then back between the strip 19 and the flange 12, but the sliding engagement of these surfaces will minimize such passage of material.

In the embodiment of Figure 3, the flexible strip 19' comprises a rubberized fabric 25, to which the rivets 18 are connected, and which extends outwardly from the ends of the slats 17. A rubber strip 26 is secured along the top of the fabric 25 at the outer edge thereof, preferably by vulcanizing in a manner known to the art, to form the thickened portion of the strip 19'.

I claim:

1. A harvester platform having a pair of longitudinally extending members forming a channel, a conveyor belt adapted to travel longitudinally on said platform, a flexible element divided longitudinally into a thin portion and a thicker portion, said thin portion being secured along an edge of said belt and the thicker portion extending within said channel and adapted to slide therein during operation.

2. In a harvester platform, a longitudinal frame member adapted to support a cutter bar along one side, means along the opposite side of said frame member defining a longitudinally extending channel, a conveyor belt movable longitudinally along said frame member for receiving crops that fall thereover, one edge of said belt being disposed within said channel and having sufficient uniform thickness to slidably contact both upper and lower surfaces of said channel to serve as a seal against passage of crop material therethrough, and a plurality of longitudinally spaced, transverse slats attached to said belt and terminating outside said channel, the top of said member being substantially flush with the top surfaces of said slats.

3. In a harvester platform, a longitudinal frame member adapted to support a cutter bar along one side, means along the opposite side of said frame member defining a longitudinally extending channel, a conveyor belt movable longitudinally along said frame member for receiving crops that fall thereover, a thickened portion along the edge of the belt having an upper surface raised above the upper surface of the belt, said thickened portion being disposed within said channel in continuous slidable contact with both upper and lower surfaces of said channel to serve as a seal against passage of crop material therethrough, and a plurality of longitudinally spaced, transverse slats attached to said belt and terminating outside said channel, the top of said member being substantially flush with the top surfaces of said slats.

LOUIS A. PARADISE.